United States Patent
Rankin et al.

(10) Patent No.: US 9,235,511 B2
(45) Date of Patent: Jan. 12, 2016

(54) SOFTWARE PERFORMANCE BY IDENTIFYING AND PRE-LOADING DATA PAGES

(71) Applicant: International Business Machines Corporation, Armonk, NY (US)

(72) Inventors: Thomas F. Rankin, Wallkill, NY (US); Elpida Tzortzatos, Lagrangeville, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 213 days.

(21) Appl. No.: 13/874,699

(22) Filed: May 1, 2013

(65) Prior Publication Data

US 2014/0331010 A1 Nov. 6, 2014

(51) Int. Cl.
*G06F 12/08* (2006.01)
*G06F 9/38* (2006.01)

(52) U.S. Cl.
CPC .............. *G06F 12/08* (2013.01); *G06F 9/383* (2013.01); *G06F 12/0862* (2013.01); *G06F 2212/6028* (2013.01)

(58) Field of Classification Search
None
See application file for complete search history.

(56) References Cited

U.S. PATENT DOCUMENTS

| | | | | |
|---|---|---|---|---|
| 7,177,985 | B1* | 2/2007 | Diefendorff | 711/137 |
| 7,257,810 | B2* | 8/2007 | Tirumalai et al. | 717/160 |
| 7,849,453 | B2* | 12/2010 | Tirumalai et al. | 717/160 |
| 7,975,108 | B1* | 7/2011 | Holscher et al. | 711/137 |
| 8,069,440 | B2 | 11/2011 | Tirumalai et al. | |
| 2002/0091915 | A1* | 7/2002 | Parady | 712/225 |
| 2003/0105926 | A1* | 6/2003 | Rodriguez | 711/129 |
| 2004/0205298 | A1* | 10/2004 | Bearden et al. | 711/137 |
| 2005/0066354 | A1* | 3/2005 | Dellow et al. | 725/30 |
| 2005/0235125 | A1* | 10/2005 | Accapadi et al. | 711/170 |
| 2006/0212658 | A1* | 9/2006 | Hrle et al. | 711/137 |
| 2007/0088915 | A1* | 4/2007 | Archambault et al. | 711/137 |
| 2008/0229071 | A1* | 9/2008 | Shioya et al. | 712/207 |
| 2009/0210662 | A1* | 8/2009 | Schroter et al. | 712/207 |
| 2010/0095271 | A1 | 4/2010 | Archambault et al. | |
| 2010/0153653 | A1* | 6/2010 | El-Mahdy et al. | 711/137 |
| 2011/0167496 | A1* | 7/2011 | McPhail et al. | 726/24 |
| 2012/0227033 | A1* | 9/2012 | Yu | 717/124 |

\* cited by examiner

*Primary Examiner* — Aimee Li
*Assistant Examiner* — Dustin Bone
(74) *Attorney, Agent, or Firm* — Cantor Colburn LLP

(57) ABSTRACT

Embodiments relate to methods, computer systems and computer program products for improving software performance by identifying and preloading data pages. Embodiments include executing an instruction that requests a data page from the one or more auxiliary storage devices. Based on determining that the instruction is present in the long-running instruction list, embodiments include examining one or more characteristics of a plurality of data pages that will be requested by the instruction. Based on determining that the plurality of data pages are located on a single auxiliary storage device and that the plurality of data pages can be efficiently retrieved by the single auxiliary storage device, embodiments include initiating a pre-load operation to move the plurality of data pages to the main memory.

14 Claims, 4 Drawing Sheets

SOFTWARE PERFORMANCE BY IDENTIFYING AND PRE-LOADING DATA PAGES

BACKGROUND

The present invention relates generally to management of memory resources, and more specifically, to improving software performance by identifying and pre-loading data pages into main memory.

Currently, some instructions in various computer architectures can be restarted after they are interrupted. When an interrupt takes place, the operating system examines the instruction and its data to see if it can take an action to successfully restart the instruction. For example, an instruction can be interrupted when the instruction attempts to reference data that is not currently in main memory. The operating system can then bring the required data into main memory so that the instruction can be restarted. If the instruction references many pieces of data that are not in main memory, it will go through a loop of being interrupted, being examined, having data structures created for I/O, initiating I/O, waiting for I/O to complete, being restarted, and processing the data. This loop will have to be performed as many times as the requested data is not available in main memory.

A pre-loading operation is an operation that loads into main memory a data page that has not yet been explicitly requested. Currently, many operating systems implement pre-loading operations, which load data pages that are either in consecutive locations or in predictable locations of storage to data pages that have been requested. In general, if an application running on a computer system references many pages of storage from outside of main memory, the performance of the application can be increased by pre-loading the pages into main memory before the data pages are to be operated on. Methods for pre-loading pages into the main memory are well known in the art.

Some currently available methods of determining what data pages to pre-load into main memory require intricate knowledge of data reference patterns or specific input from the user or the application program. If the input provided by the user or application is incorrect, the performance of the application will be degraded. Another available method of determining what data pages to pre-load into main memory includes a guess by the operating system that past data page reference patterns will continue in the future. If this assumption is not true, performance of the application can be degraded.

SUMMARY

Embodiments include a computer system for improving software performance by identifying and pre-loading data pages. The system includes a storage manager configured to communicate with a real memory and one or more auxiliary storage devices, the storage manager including a long-running instruction list, the computer system configured to perform a method. The method includes executing an instruction that requests a data page from the one or more auxiliary storage devices. Based on determining that the instruction is present in the long-running instruction list, the method includes examining one or more characteristics of a plurality of data pages that will be requested by the instruction. Based on determining that the plurality of data pages are located on a single auxiliary storage device and that the plurality of data pages can be efficiently retrieved by the single auxiliary storage device, the method includes initiating a pre-load operation to move the plurality of data pages to the main memory.

Embodiments also include a computer implemented method for improving software performance by identifying and preloading data pages. The method includes executing an instruction that requests a data page from the one or more auxiliary storage devices. Based on determining that the instruction is present in the long-running instruction list, the method includes examining one or more characteristics of a plurality of data pages that will be requested by the instruction. Based on determining that the plurality of data pages are located on a single auxiliary storage device and that the plurality of data pages can be efficiently retrieved by the single auxiliary storage device, the method includes initiating a pre-load operation to move the plurality of data pages to the main memory.

Embodiments further include a computer program product for improving software performance by identifying and pre-loading data pages, the computer program product including a tangible storage medium readable by a processing circuit and storing instructions for execution by the processing circuit for performing a method. The method includes executing an instruction that requests a data page from the one or more auxiliary storage devices. Based on determining that the instruction is present in the long-running instruction list, the method includes examining one or more characteristics of a plurality of data pages that will be requested by the instruction. Based on determining that the plurality of data pages are located on a single auxiliary storage device and that the plurality of data pages can be efficiently retrieved by the single auxiliary storage device, the method includes initiating a pre-load operation to move the plurality of data pages to the main memory.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

In exemplary embodiments, methods, systems and computer program products for improving software performance by identifying and pre-loading data pages are provided. In exemplary embodiments, a pre-determined list of long running instructions is maintained. Upon execution of one of the instructions in the list, the instruction is examined to determine if the source pages or target pages of the instruction are good candidates for pre-loading.

Figure 1:
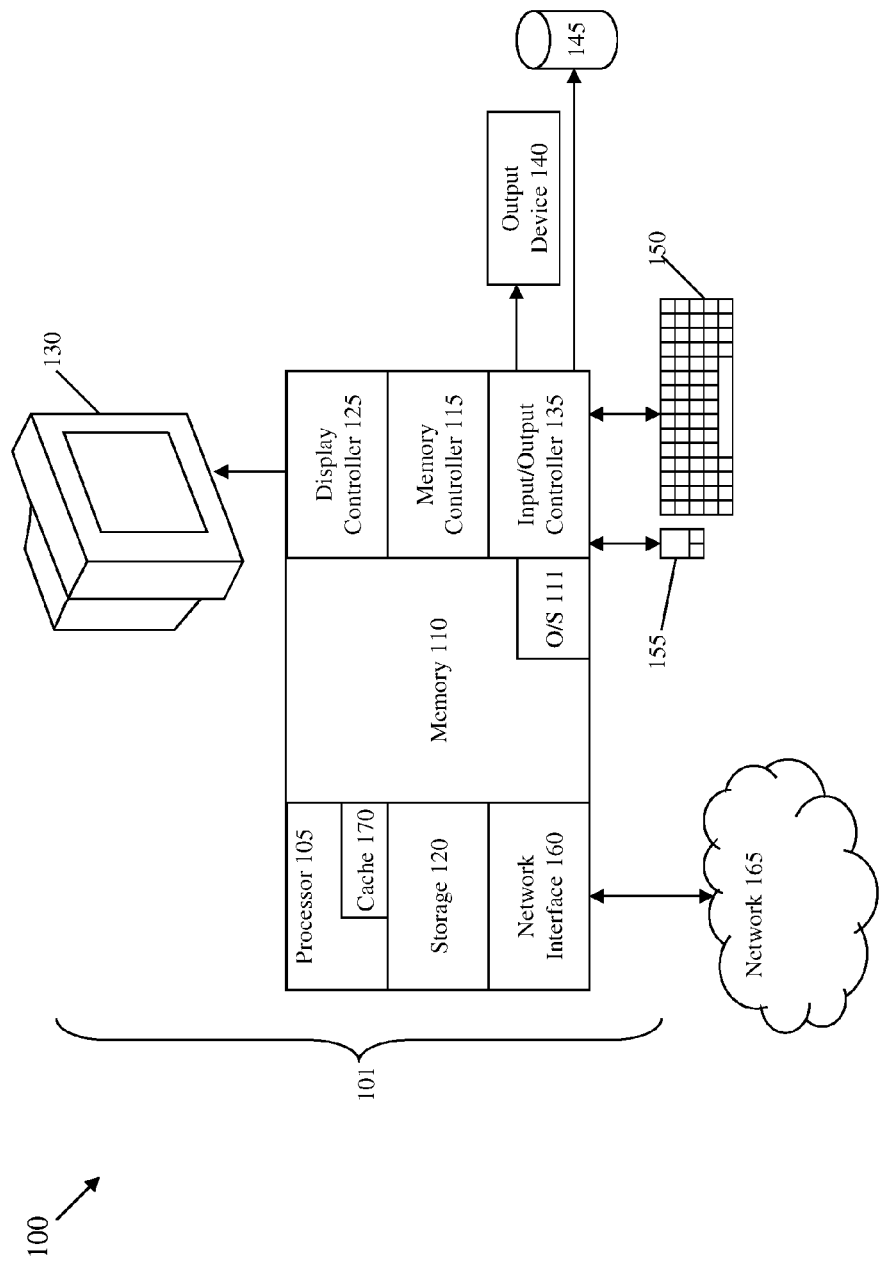
FIG. 1 illustrates a block diagram of a system in accordance with an exemplary embodiment.

FIG. 1 illustrates a block diagram of an exemplary computer system 100 for use with the teachings herein. The methods described herein can be implemented in hardware software (e.g., firmware), or a combination thereof. In an exemplary embodiment, the methods described herein are implemented in hardware, and is part of the microprocessor of a special or general-purpose digital computer, such as a personal computer, workstation, minicomputer, or mainframe computer. The system 100 therefore includes general-purpose computer 101.

In an exemplary embodiment, in terms of hardware architecture, as shown in FIG. 1, the computer 101 includes a processor 105, memory 110 coupled via a memory controller 115, a storage device 120, and one or more input and/or output (I/O) devices 140, 145 (or peripherals) that are communicatively coupled via a local input/output controller 135. The input/output controller 135 can be, for example, but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The storage device 120 may include one or more hard disk drives (HDD), solid state drives (SSD), or any other suitable form of storage.

The processor 105 is a computing device for executing hardware instructions or software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions. The processor 105 may include a cache 170, which may be organized as a hierarchy of more cache levels (L1, L2, etc.).

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially controls the execution of other computer programs and provides scheduling, input-output control, file and data management, memory management, and communication control and related services.

In an exemplary embodiment, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In an exemplary embodiment, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In an exemplary embodiment, network 165 can be a managed IP network administered by a service provider. The network 165 may be implemented in a wireless fashion, e.g., using wireless protocols and technologies, such as Wi-Fi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the instructions in the memory 110 may further include a basic input output system (BIOS) (omitted for simplicity). The BIOS is a set of essential routines that initialize and test hardware at startup, start the OS 111, and support the transfer of data among the storage devices. The BIOS is stored in ROM so that the BIOS can be executed when the computer 101 is activated.

When the computer 101 is in operation, the processor 105 is configured to execute instructions stored within the memory 110, to communicate data to and from the memory 110, and to generally control operations of the computer 101 pursuant to the instructions.

Figure 2:
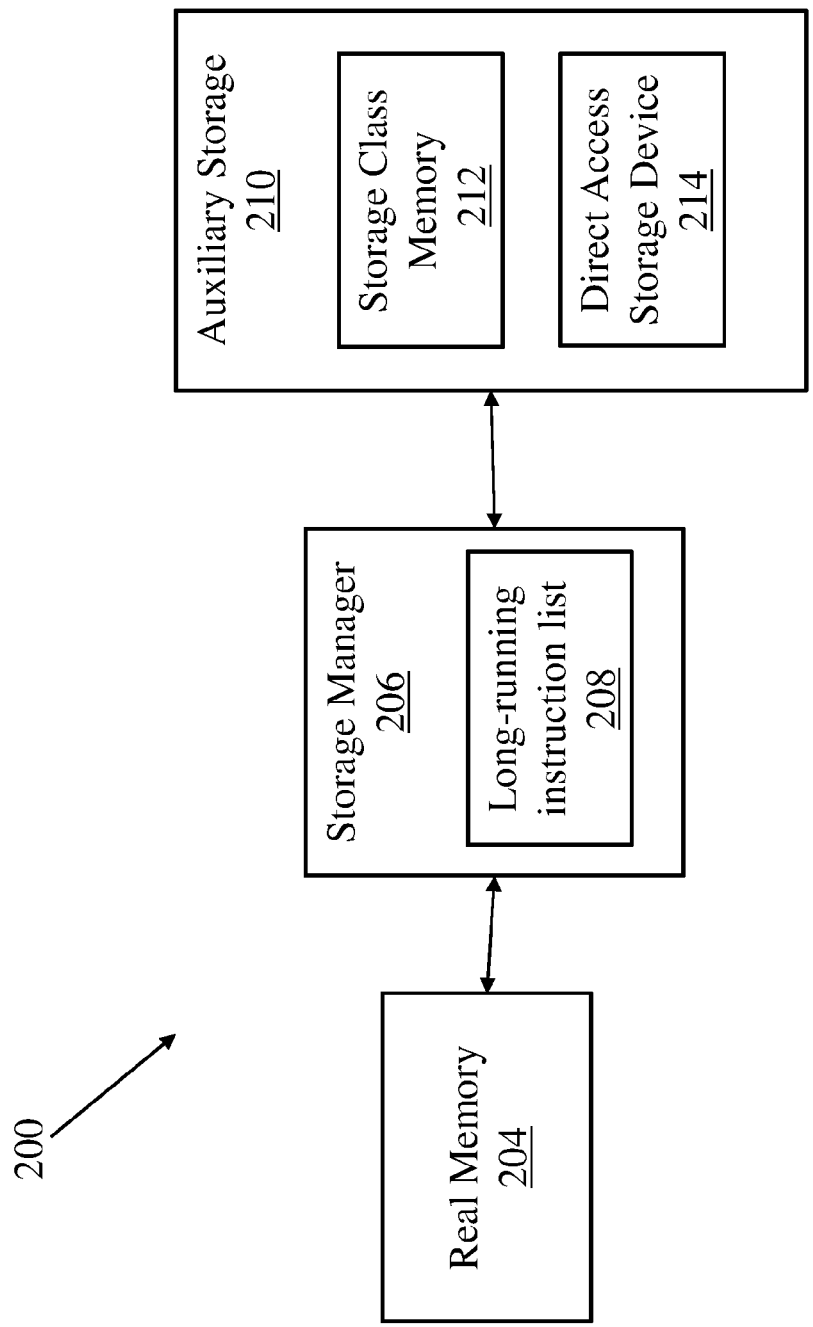
FIG. 2 depicts a block diagram of system for improving software performance by identifying and pre-loading data pages in accordance with an exemplary embodiment.

Referring now to FIG. 2, a block diagram of system 200 for improving software performance by identifying and pre-loading data pages in accordance with an exemplary embodiment is shown. As illustrated, the system 200 includes a storage manager 206 that is in communication with a real memory 204, also referred to as main memory. The system 200 also includes an auxiliary storage 210 that is in communication with the storage manager 206. In exemplary embodiments, the auxiliary storage 210 may include a storage class memory 212 and one or more direct access storage devices 214. In exemplary embodiments, the storage class memory 210 may include a variety of storage devices including, but not limited to, one or more flash devices.

In exemplary embodiments, the storage manager 206 includes a long-running instruction list 208. Upon the execution of each of the instructions in the long running instruction list 208, the storage manager 206 will attempt to pre-load data pages required by the instruction from the auxiliary storage 210 into the real memory 204. In exemplary embodiments, the long-running instruction list 208 includes, but is not limited to, a move character long (MVCL) instruction, a move character long extended (MVCLE) instruction, a compare logical character long (CLCL) instruction, and a compare logical character long extended (CLCLE) instruction. If the storage manager 206 determines that the instruction being executed is in the long-running instruction list 208, the storage manager 206 examines the instruction more closely to see if the source pages or target pages that will be required by the instruction are good candidates for pre-loading.

Figure 3:
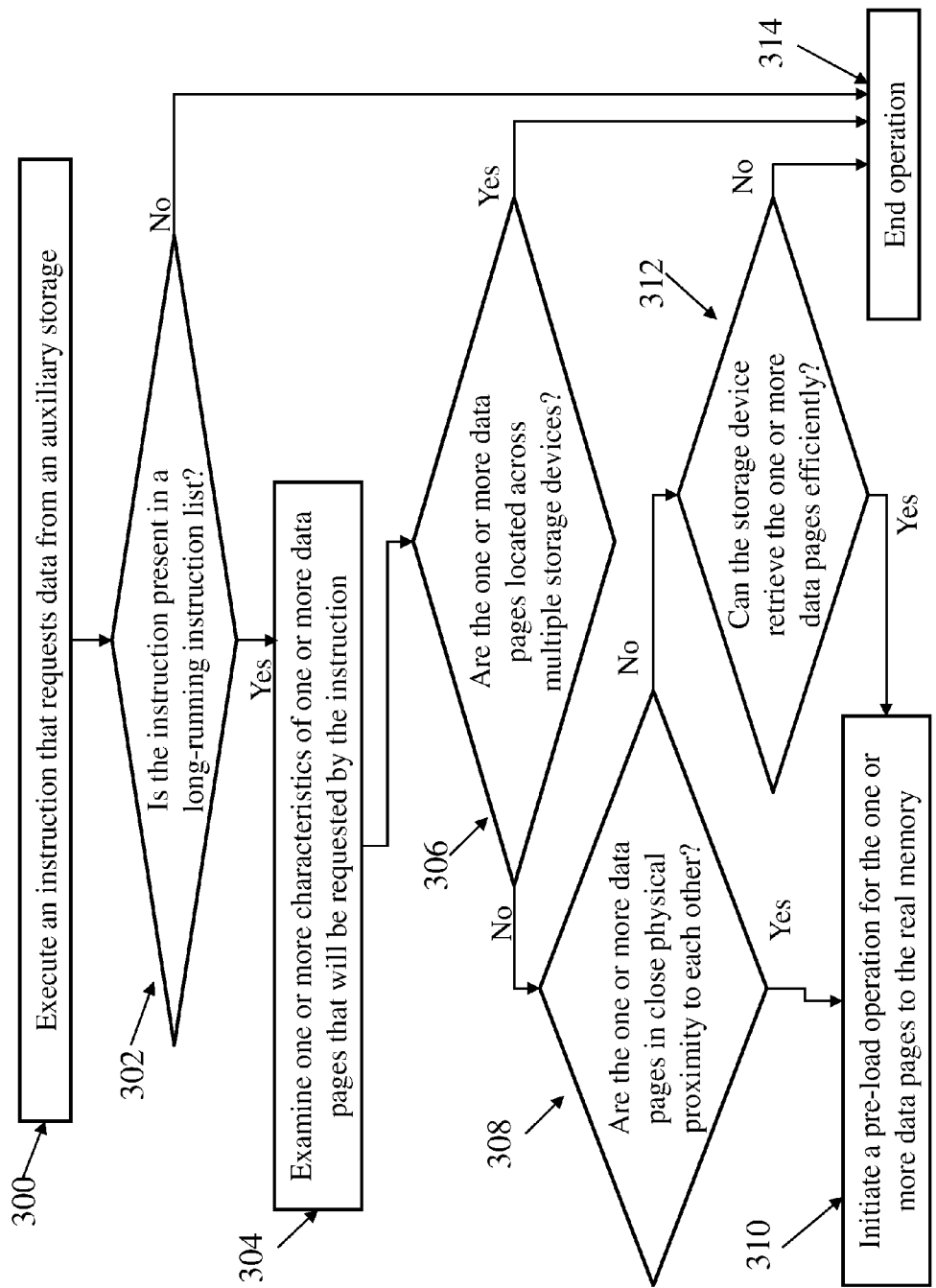
FIG. 3 depicts a process flow for a method for improving software performance by identifying and pre-loading data pages in accordance with exemplary embodiment.

Referring now to FIG. 3, a process flow for a method for improving software performance by identifying and pre-loading data pages in accordance with exemplary embodiments is shown. As shown at block 300, the method begins with executing an instruction that requests a data page from an auxiliary storage device. Next, as shown at decision block 302, the method includes determining if the instruction is present in a long-running instruction list. If the instruction is not present in a long-running instruction list, the method proceeds to block 314 and concludes without pre-loading the one or more data pages. Otherwise, the method proceeds to block 304 where one or more characteristics of the data pages that will be requested by the instruction are examined.

Continuing with reference to FIG. 3, as shown at decision block 306, the method includes determining if the data pages that will be requested by the instruction are located across multiple storage devices. If the data pages that will be requested by the instruction are located across multiple storage devices, the method proceeds to block 314 and concludes without pre-loading the one or more data pages. Otherwise, the method proceeds to decision block 308 where it is determined if the one or more data pages are in close physical proximity to each other. If the one or more data pages are in close physical proximity to each other, the method proceeds to block 310 and initiates a pre-load operation of the one or more data pages to the real memory. Otherwise, the method proceeds to decision block 312 where it is determined if the storage device can efficiently retrieve the one or more data pages. If the storage device can efficiently retrieve the one or more data pages, the method proceeds to block 310 and initiates a pre-load operation of the one or more data pages to the real memory. Otherwise, the method proceeds to block 314 and concludes without pre-loading the one or more data pages.

In exemplary embodiments, the method may also include determining an amount of real memory available prior to initiating a pre-load operation of the one or more data pages to the real memory. If it is determined that the main memory is constrained, the pre-loading would not be performed.

Figure 4:
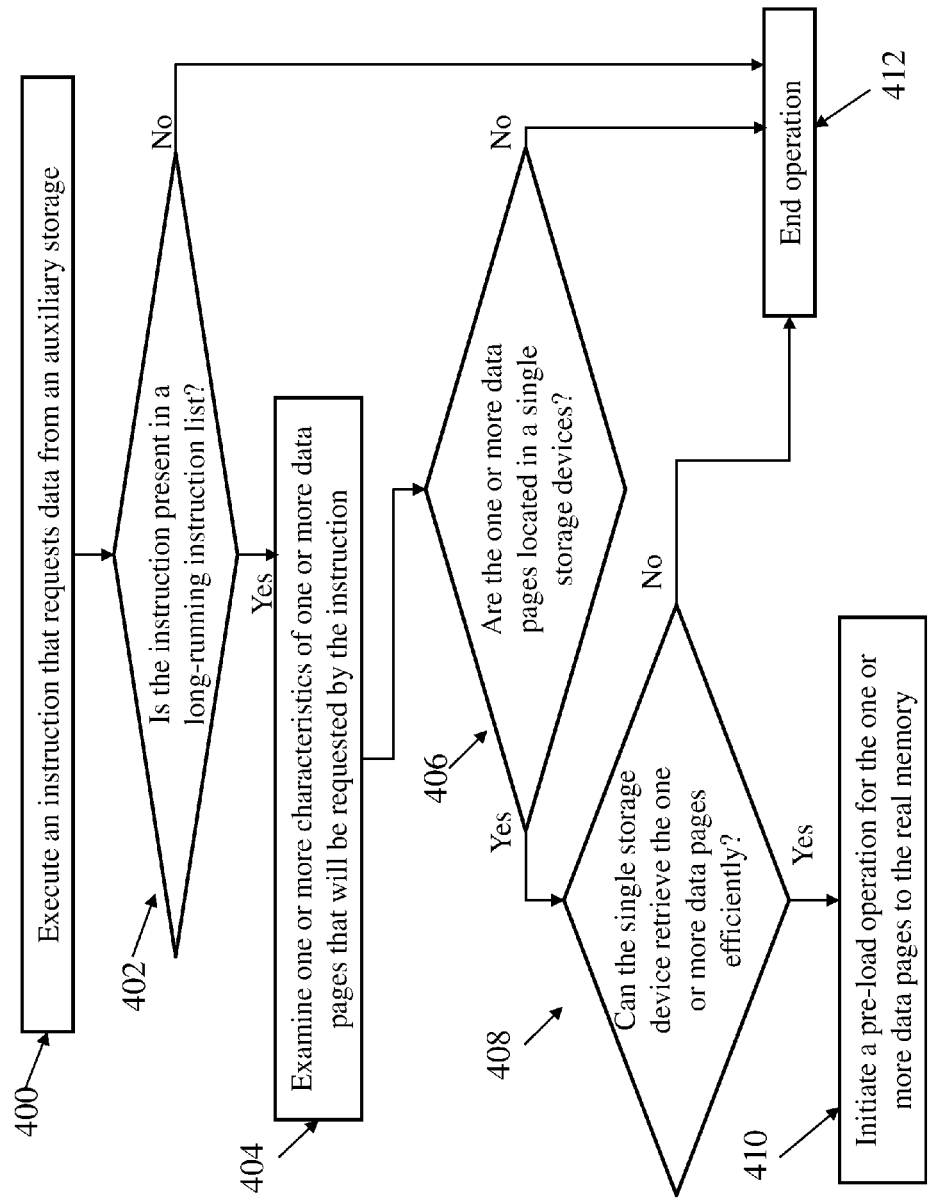
FIG. 4 depicts a process flow for a method for improving software performance by identifying and pre-loading data pages in accordance with exemplary embodiment.

Referring now to FIG. 4, a process flow for a method for improving software performance by identifying and pre-loading data pages in accordance with exemplary embodiments is shown. The method begins at block 400 by executing an instruction that requests a data page from one or more auxiliary storage devices. Next, as shown at decision block 402, the method includes determining if instruction is present in the long-running instruction list. If the instruction is present in the long-running instruction list, the method proceeds to block 404 and examines one or more characteristics of a plurality of data pages that will be requested by the instruction. If the instruction is not present in the long-running instruction list, the method proceeds to block 412 and concludes without pre-loading the one or more data pages.

Next, as shown at decision block 406, the method includes determining if the plurality of data pages are located on a single auxiliary storage device. If the plurality of data pages are located on a single auxiliary storage device, the method proceeds to decision block 408 and determines if the plurality of data pages can be efficiently retrieved by the single auxiliary storage device. Based on a determination that the plurality of data pages can be efficiently retrieved by the single auxiliary storage device, the method proceed to block 410 and initiates a pre-load operation to move the plurality of data pages to the real memory. Based on a determination that the plurality of data pages are not located on a single auxiliary storage device or that the plurality of data pages can not be efficiently retrieved by the single auxiliary storage device, the method proceeds to block 412 and concludes without pre-loading the one or more data pages.

In exemplary embodiments, examining one or more characteristics of the plurality of data pages that will be requested by the instruction may be limited to examining the one or more characteristics of a maximum number of data pages that is less than a number of the plurality of data pages. In one embodiment, the one or more characteristics of the plurality of data pages may include, but are not limited to, a location of the data page, a size of the data page and a type of auxiliary storage device the data page is located on.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system for improving software performance by identifying and pre-loading data pages, the computer system comprising:
    a storage manager configured to communicate with a real memory and a plurality of auxiliary storage devices, the storage manager including an instruction list, the computer system having a processor configured to perform a method comprising:
    executing, by the processor, an instruction that requests a data page from the plurality of auxiliary storage devices;
    based on determining that the instruction is present in the instruction list, examining one or more characteristics of a plurality of data pages that will be requested by the instruction, wherein the instruction list consists of move character long instructions, move character long extended instructions, compare logical character long instructions, and compare logical character long extended instructions; and
    based on determining that the plurality of data pages are located on a single auxiliary storage device, initiating a pre-load operation to move the plurality of data pages to the main memory.

2. The computer system of claim 1, wherein examining one or more characteristics of the plurality of data pages that will be requested by the instruction further comprises examining the one or more characteristics of a maximum number of data pages that is less than a number of the plurality of data pages.

3. The computer system of claim 1, wherein the one or more characteristics of each of the plurality of data pages comprise at least one of the following:
    a location of the data page,
    a size of the data page, and
    a type of auxiliary storage device the data page is located on.

4. The computer system of claim 1, wherein the plurality of auxiliary storage device include a storage class memory.

5. A computer implemented method for improving software performance by identifying and pre-loading data pages, the method comprising:
    executing, by a processor, an instruction that requests a data page from a plurality of auxiliary storage devices;
    based on determining that the instruction is present in an instruction list, examining one or more characteristics of a plurality of data pages that will be requested by the instruction, wherein the instruction list consists of move character long instructions, move character long extended instructions, compare logical character long instructions, and compare logical character long extended instructions; and based on determining that the plurality of data pages are located on a single auxiliary storage device, initiating a pre-load operation to move the plurality of data pages to the main memory.

6. The computer implemented method of claim 5, wherein examining one or more characteristics of the plurality of data pages that will be requested by the instruction further comprises examining the one or more characteristics of a maximum number of data pages that is less than a number of the plurality of data pages.

7. The computer implemented method of claim 5, wherein the one or more characteristics of each of the plurality of data pages comprise at least one of the following:
   a location of the data page,
   a size of the data page, and
   a type of auxiliary storage device the data page is located on.

8. The computer implemented method of claim 5, wherein the plurality of auxiliary storage devices include a storage class memory.

9. The computer implemented method of claim 5, further comprising:
   determining an amount of main memory available prior to initiating the pre-load operation to move the plurality of data pages to the main memory;
   based on a determination that that the main memory is greater than a threshold amount, initiating the pre-load operation to move the plurality of data pages to the main memory; and
   based on a determination that the main memory is less than the threshold amount, concluding without initiating the pre-load operation to move the plurality of data pages to the main memory.

10. A computer program product for improving software performance by identifying and pre-loading data pages, the computer program product comprising:
   a tangible non-transitory storage medium readable by a processing circuit and storing instructions for execution by the processing circuit for performing a method comprising:
      executing, by a processor, an instruction that requests a data page from a plurality of auxiliary storage devices;
      based on determining that the instruction is present in an instruction list, examining one or more characteristics of a plurality of data pages that will be requested by the instruction, wherein the instruction list consists of move character long instructions, move character long extended instructions, compare logical character long instructions, and compare logical character long extended instructions; and based on determining that the plurality of data pages are located on a single auxiliary storage device, initiating a pre-load operation to move the plurality of data pages to the main memory.

11. The computer program product of claim 10, wherein examining one or more characteristics of the plurality of data pages that will be requested by the instruction further comprises examining the one or more characteristics of a maximum number of data pages that is less than a number of the plurality of data pages.

12. The computer program product of claim 10, wherein the one or more characteristics of each of the plurality of data pages comprise at least one of the following:
   a location of the data page,
   a size of the data page, and
   a type of auxiliary storage device the data page is located on.

13. The computer program product of claim 10, wherein the more plurality of auxiliary storage devices include a storage class memory.

14. The computer program product of claim 10, further comprising:
   determining an amount of main memory available prior to initiating the pre-load operation to move the plurality of data pages to the main memory;
   based on a determination that the main memory is greater than a threshold amount, initiating the pre-load operation to move the plurality of data pages to the main memory; and
   based on a determination that that the main memory is less than the threshold amount, concluding without initiating the pre-load operation to move the plurality of data pages to the main memory.

\* \* \* \* \*